US011967260B2

(12) United States Patent
Kim et al.

(10) Patent No.: US 11,967,260 B2
(45) Date of Patent: Apr. 23, 2024

(54) DISPLAY DEVICE WITH POWER MANAGEMENT CIRCUIT FOR TRANSFORMING PERIOD

(71) Applicant: LG Display Co., Ltd., Seoul (KR)

(72) Inventors: Jinwon Kim, Paju-si (KR); MooKyoung Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/980,195

(22) Filed: Nov. 3, 2022

(65) Prior Publication Data

US 2023/0206798 A1 Jun. 29, 2023

(30) Foreign Application Priority Data

Dec. 29, 2021 (KR) ........................ 10-2021-0191004

(51) Int. Cl.

| | |
|---|---|
| ***G09G 3/00*** | (2006.01) |
| ***G09G 3/20*** | (2006.01) |
| ***G09G 3/3233*** | (2016.01) |
| ***G09G 3/3283*** | (2016.01) |
| *G09G 3/32* | (2016.01) |

(52) U.S. Cl.

CPC ........... *G09G 3/035* (2020.08); *G09G 3/2074* (2013.01); *G09G 3/3233* (2013.01); *G09G 3/3283* (2013.01); *G09G 3/32* (2013.01); *G09G 2300/0408* (2013.01); *G09G 2300/0426* (2013.01); *G09G 2300/0819* (2013.01); *G09G 2300/0842* (2013.01); *G09G 2310/08* (2013.01); *G09G 2320/0233* (2013.01); *G09G 2330/021* (2013.01)

(58) Field of Classification Search

CPC ....................................................... G09G 3/035

See application file for complete search history.

(56) References Cited

U.S. PATENT DOCUMENTS

| | | | | |
|---|---|---|---|---|
| 9,934,721 | B2 * | 4/2018 | An | G09G 3/3225 |
| 2014/0118319 | A1 * | 5/2014 | Jeon | G06F 1/00 345/207 |
| 2014/0306985 | A1 * | 10/2014 | Jeong | G06F 1/1652 345/600 |
| 2015/0301672 | A1 * | 10/2015 | Kim | G09G 3/035 345/156 |
| 2017/0148419 | A1 * | 5/2017 | Zhang | G09G 3/035 |
| 2019/0073946 | A1 * | 3/2019 | Su | H10K 50/81 |

* cited by examiner

*Primary Examiner* — William Boddie
*Assistant Examiner* — Andrew B Schnirel
(74) *Attorney, Agent, or Firm* — Fenwick & West LLP

(57) ABSTRACT

A display device is disclosed that includes a display panel on which one or more sub-pixels including a light emitting device and a driving transistor for driving the light emitting device are disposed in a display area, and whose shape is changed during a transforming period, a timing controller for receiving image data and a command signal defining the transforming period, and converting the image data to output converted image data, and a data driving circuit for receiving the converted image data and outputting a data voltage, wherein, in the transforming period, at least one sub-pixel emits light based on the image data input to the timing controller, and emits light with a luminance lower than a luminance corresponding to a grayscale of the image data. Accordingly, there may be provided a display device capable of changing a shape during an image display period.

18 Claims, 10 Drawing Sheets

DISPLAY DEVICE WITH POWER MANAGEMENT CIRCUIT FOR TRANSFORMING PERIOD

CROSS REFERENCE TO RELATED APPLICATION

This application claims priority from Republic of Korea Patent Application No. 10-2021-0191004, filed on Dec. 29, 2021, which is hereby incorporated by reference fin its entirety.

TECHNICAL FIELD

Embodiments of the present disclosure relate to a display device.

BACKGROUND

As the information society develops, there is an increasing demand for a display device for displaying an image in various forms, and in recent years, various display devices such as a liquid crystal display device and an organic light emitting display device are utilized.

Recently, in order to provide a user with a highly immersive image viewing environment, display devices of various form factors have been used.

A flexible display device has been proposed as an example of the various form factors. The flexible display device can implement various designs and has advantages in portability and durability. The flexible display device may be implemented as a display device of various types, such as a bendable display device, a foldable display device, and a rollable display device.

Meanwhile, in order to provide a user with a more various image viewing experience, there is a demand for a display device in which the shape of a display panel can be changed while the user views an image.

SUMMARY

Embodiments of the present disclosure may provide a display device in which the shape of a display panel can be changed during an image display period.

Embodiments of the present disclosure may provide a display device including a display panel on which one or more sub-pixels including a light emitting device and a driving transistor configured to drive the light emitting device are disposed in a display area, and whose shape is changed during a transforming period, a timing controller configured to receive image data and a command signal defining the transforming period, and convert the image data to output converted image data, and a data driving circuit configured to receive the converted image data and output a data voltage, wherein, in the transforming period, at least one sub-pixel emits light based on the image data input to the timing controller, and emits light with a luminance lower than a luminance corresponding to a grayscale of the image data.

According to embodiments of the present disclosure, it is possible to provide a display device in which the shape of a display panel can be changed during an image display period.

DETAILED DESCRIPTION

Figure 1:
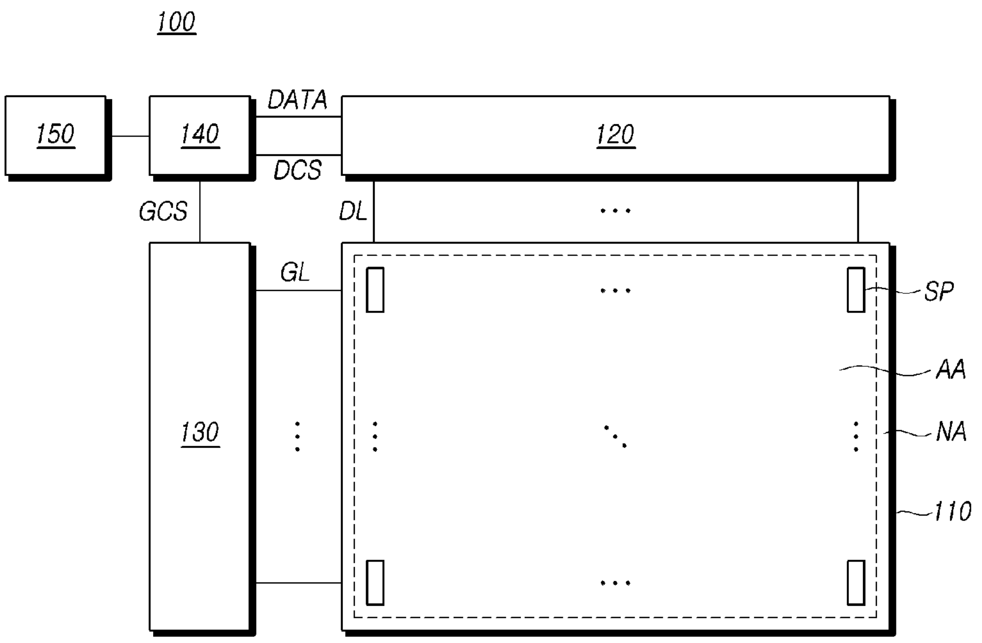
FIG. 1 schematically illustrates a display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the present invention. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to the accompanying drawings.

FIG. 1 is a diagram schematically illustrating a display device 100 according to embodiments of the present disclosure.

Referring to FIG. 1, a display device 100 according to embodiments of the present disclosure may include a display panel 110, a data driving circuit 120 and a gate driving circuit 130 for driving the display panel 110, and a timing controller 140 configured to control the data driving circuit 120 and the gate driving circuit 130.

Signal lines such as a plurality of data lines DL and a plurality of gate lines GL may be disposed on the display panel 110 on a substrate. A plurality of sub-pixels SP electrically connected to a plurality of data lines DL and a plurality of gate lines GL may be disposed on the display panel 110.

The display panel 110 may include a display area AA in which an image is displayed and a non-display area NA in which an image is not displayed. A plurality of sub-pixels SP for displaying an image are disposed in the display area AA. The data driving circuit 120 and the gate driving circuit 130 may be mounted in the non-display area NA, or a pad portion connected to the data driving circuit 120 or the gate driving circuit 130 may be disposed.

The data driving circuit 120 is a circuit configured to drive a plurality of data lines DL, and may supply a data voltage to the plurality of data lines DL. The gate driving circuit 130 is a circuit configured to drive the plurality of gate lines GL, and may supply gate signals (also referred to as gate voltages or scan signals) to the plurality of gate lines GL. The timing controller 140 may supply a data driving timing control signal DCS to the data driving circuit 120 to control the operation of the data driving circuit 120. The timing controller 140 may supply a gate driving timing control signal GCS for controlling the operation timing of the gate driving circuit 130 to the gate driving circuit 130.

The timing controller 140 may start a scan according to the timing implemented in each frame, convert the input image data input from the outside to match the data signal format used by the data driving circuit 120, supply the converted image data DATA to the data driving circuit 120, and control the data driving at a proper time according to the scan.

The timing controller 140 may receive, together with the input image data, various timing signals including a vertical synchronization signal Vsync, a horizontal synchronization signal Hsync, an input image data enable signal DE, and a clock signal CLK from a host system 150.

The timing controller 140 may, in order to control the data driving circuit 120 and the gate driving circuit 130, receive the vertical synchronization signal Vsync, the horizontal synchronization signal Hsync, the input data enable signal DE, and the clock signal CLK, etc., and may generate various control signals (e.g., DCS, GCS, etc.) to output to the data driving circuit 120 and the gate driving circuit 130.

The timing controller 140 may output various data driving timing control signals DCS including a source start pulse SSP, a source sampling clock SSC, and the like in order to control the data driving circuit 120.

The timing controller 140 may output various gate driving timing control signals GCS including a gate start pulse GSP, a gate shift clock GSC, a gate output enable signal GOE and the like in order to control the gate driving circuit 130.

The data driving circuit 120 receives the converted image data DATA from the timing controller 140 and drives the plurality of data lines DL.

The data driving circuit 120 may include one or more source driver integrated circuits SDICs.

Each source driver integrated circuit SDIC may be connected to the display panel 110 by a tape automated bonding (TAB) method, or may be connected to the bonding pad of the display panel 110 in a chip-on-glass (COG) method, or may be implemented in a chip-on-film (COF) method to be electrically connected to the display panel 110.

The gate driving circuit 130 may output a gate signal having a turn-on level voltage or a gate signal having a turn-off level voltage under the control of the timing controller 140. The gate driving circuit 130 may drive the plurality of gate lines GL by supplying a gate signal having a turn-on level voltage to the plurality of gate lines GL.

The gate driving circuit 130 may be connected to the display panel 110 by a tape automatic bonding (TAB) method, or may be connected to the bonding pad of the display panel 110 by a chip-on-glass (COG) method or a chip-on-panel (COP) method, or may be electrically connected to the display panel 110 according to a chip-on-film (COF) method.

The gate driving circuit 130 may be formed in the non-display area NA of the display panel 110 in a gate-in-panel (GIP) type. The gate driving circuit 130 may be disposed on or connected to the substrate of the display panel 110. In the case of the gate-in-panel (GIP) type, the gate driving circuit 130 may be disposed in the non-display area NA of the substrate. The gate driving circuit 130 may be connected to the substrate of the display panel 110 in the case of a chip-on-glass (COG) method or a chip-on-film (COF) method.

If a specific gate line GL is turned on by the gate driving circuit 130, the data driving circuit 120 may convert the image data DATA received from the timing controller 140 into an analog data voltage to supply to the plurality of data lines DL.

The data driving circuit 120 may be connected to or disposed on one side (e.g., an upper side or a lower side) of the display panel 110. Depending on the driving method, the panel design method, etc., the data driving circuit 120 may be connected to or disposed on both sides (e.g., upper side and lower side) of the display panel 110, or may be connected to two or more of the four sides of the display panel 110.

The gate driving circuit 130 may be connected to one side (e.g., left side or right side) of the display panel 110. Depending on the driving method, the panel design method, etc., the gate driving circuit 130 may be connected to both sides (e.g., left side and right side) of the display panel 110, or may be connected to two or more of the four sides of the display panel 110.

The timing controller 140 may be a timing controller used in a conventional display technology, or may be a control device capable of further performing other control functions including the timing controller, or may be a circuit within the control device. The timing controller 140 may be implemented with various circuits or electronic components, such as an integrated circuit (IC), a field programmable gate array (FPGA), an application specific integrated circuit (ASIC), or a processor.

The timing controller 140 may be mounted on a printed circuit board (PCB), a flexible printed circuit board (FPCB), etc., and may be electrically connected to the data driving circuit 120 and the gate driving circuit 130 through a printed circuit board (PCB), a flexible printed circuit board (FPCB), or the like.

The timing controller 140 may transmit/receive signals to and from the data driving circuit 120 according to one or more predetermined interfaces. Here, for example, the interface may include a low voltage differential signaling (LVDS) interface, an EPI interface, and a serial peripheral interface (SPI).

The timing controller 140 may include a storage medium such as one or more registers.

The display device 100 according to the embodiments of the present disclosure may be a display device including a liquid crystal display (LCD) device with a backlight unit, or may be a self-luminous display device such as an organic light emitting diode (OLED) display, a quantum dot display, and a micro light emitting diode (micro LED) display.

In the case that the display device 100 according to the embodiments of the present disclosure is an OLED display, each sub-pixel SP may include an organic light emitting diode (OLED) emitting light as a light emitting device. If the display device 100 according to embodiments of the present disclosure is a quantum dot display, each sub-pixel SP may include a light emitting device made of quantum dots, which are semiconductor crystals that emit light by themselves. In the case that the display device according to embodiments of the present disclosure is a micro LED display, each sub-pixel SP may include the micro LED as a light emitting device, which emits light by itself and is made from inorganic materials. Hereinafter, for convenience of description, the display device 100 according to embodiments of the present disclosure will be described with an OLED display as an example, but the present disclosure is not limited thereto.

Meanwhile, in the case that the display device 100 according to the embodiments of the present disclosure is a self-luminous display device, the display panel 110 according to the embodiments of the present disclosure may be a flexible display panel.

Figure 2:
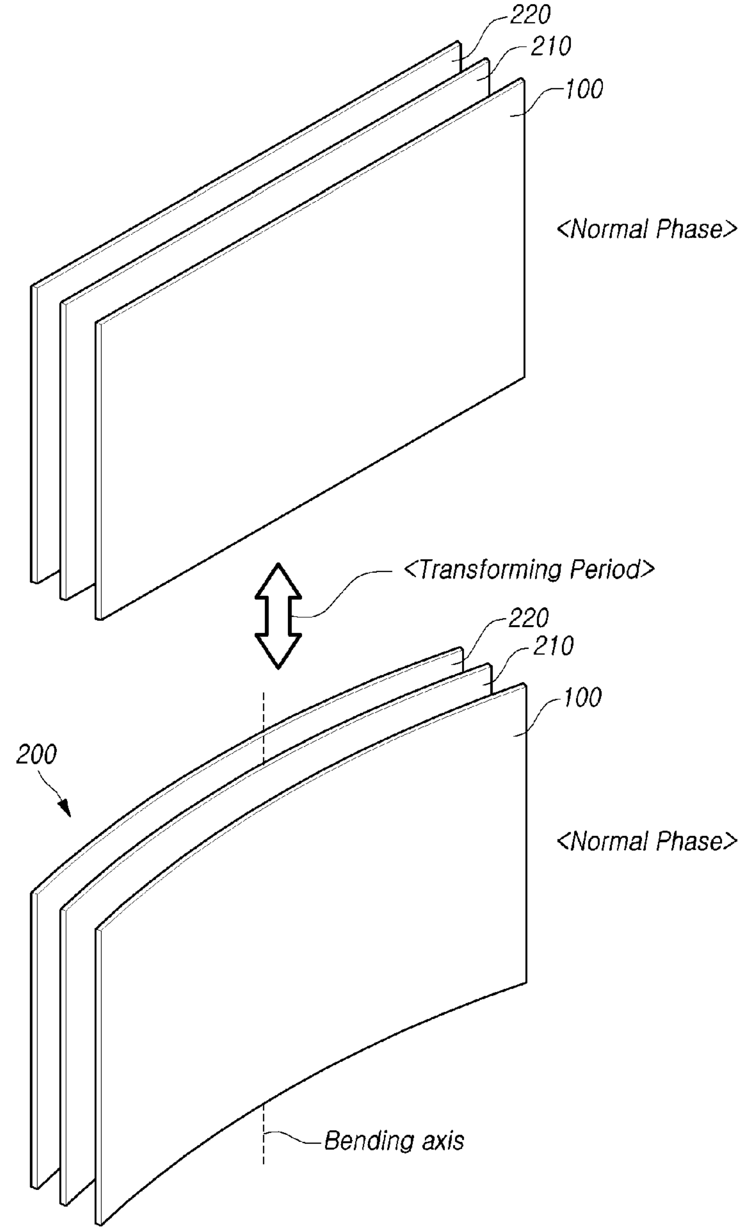
FIG. 2 is a perspective view of a flexible display device including a display device according to embodiments of the present disclosure.

FIG. 2 is a perspective view of a flexible display device 200 including the display device 100 according to embodiments of the present disclosure.

Referring to FIG. 2, the flexible display device 200 according to embodiments of the present disclosure may include the display device 100 and a back cover 210 disposed on the rear side of the display device 100. In addition, the flexible display device 200 according to embodiments of the present disclosure may further include a cover member 220 disposed on the rear side of the back cover 210.

The flexible display device 200 according to embodiments of the present disclosure may have a shape changeable to a flat shape or a curved shape. Specifically, in the flexible display device 200 according to embodiments of the present disclosure, a shape may be changed from a flat shape to a curved shape, or a shape may be changed from a curved shape to a flat shape. Accordingly, the flexible display device 200 according to embodiments of the present disclosure may be implemented in various forms, such as a bendable display device, a foldable display device, or a rollable display device.

Referring to FIG. 2, the flexible display device 200 according to embodiments of the present disclosure may have one or more bending axes. For example, in the flexible display device 200, the shape of the flexible display device 200 may be changed so that left and right sides of the display device 100 face forward with respect to the bending axis.

The flexible display device 200 may be folded based on one or more bending axes.

One or more bending axes may be located at the center of the flexible display device 200, or may be located close to an edge away from the center. But embodiments of the present disclosure are not limited thereto. The one or more bending axes may be located at any position of the flexible display device 200.

Referring to FIG. 2, the bending axis may extend from the upper side to the lower side of the flexible display device 200. Alternatively, the bending axis may extend from the left side to the right side of the flexible display device, or alternatively, extend from one side to the other side.

Meanwhile, in the case that the shape of the flexible display device 200 is changed from a flat shape to a curved shape or from a curved shape to a flat shape, a stress may be applied to the components provided in the display device 100 and the back cover 210 due to a change in shape.

For example, the shape of the flexible display device 200 may change from a normal flat shape in a normal phase or a normal state during a transforming period. When the transforming period terminates, the flexible display device 200 may have a normal curved shape in a normal phase or a normal state.

Alternatively, the shape of the flexible display device 200 may be changed during the transforming period from the normal curved shape. When the transforming period terminates, the shape of the flexible display device may be a normal flat shape.

Compared to the normal state, there may be applied more stress to the display device 100 during the transforming period in which the shape change occurs. Accordingly, during the transforming period, there may occur a problem in which the bonding state between each component of the display device 100 deteriorates, and there is required a solution to this problem.

Figure 3:
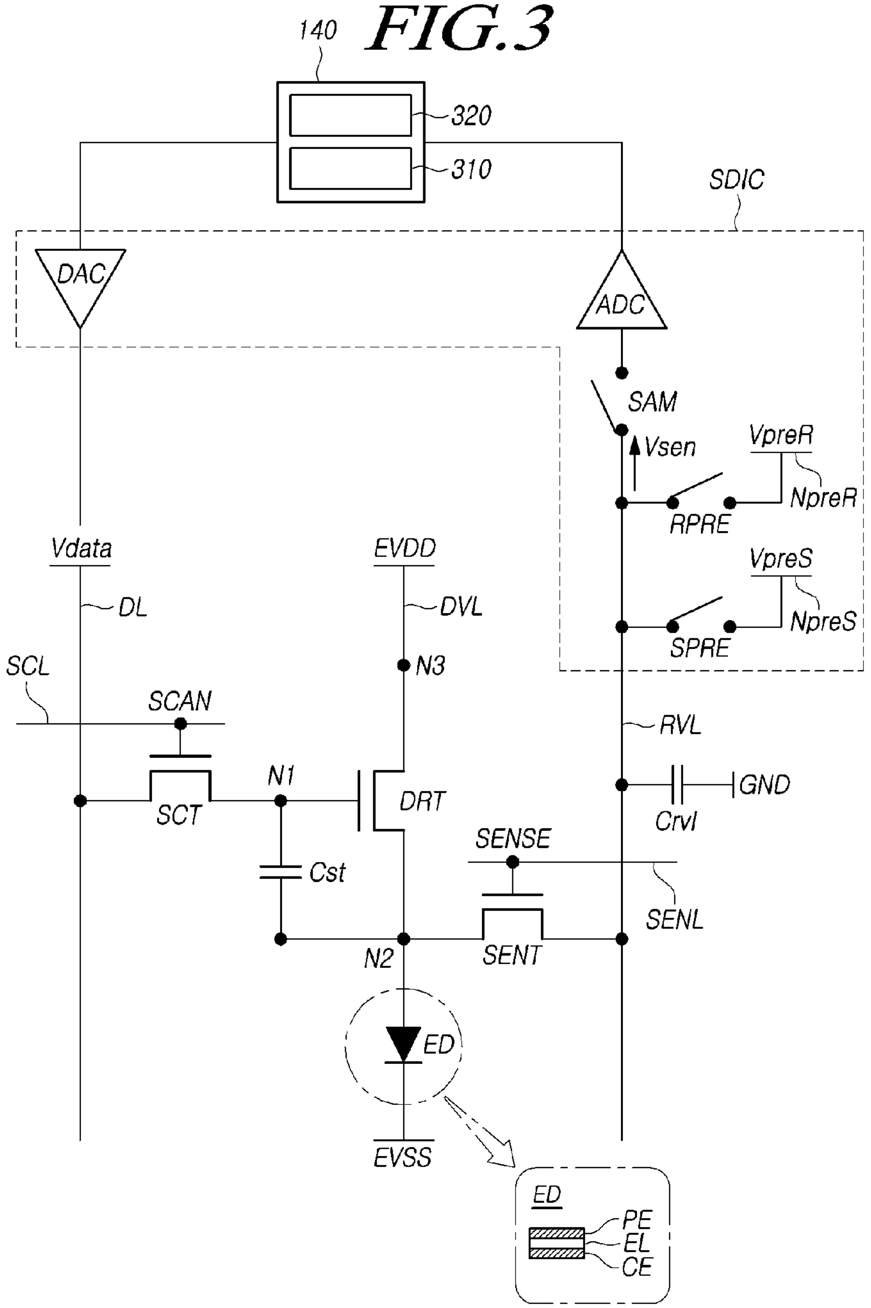
FIG. 3 schematically illustrates a sub-pixel structure and a configuration for compensating a characteristic value of a sub-pixel of a display device according to embodiments of the present disclosure.

FIG. 3 is a diagram briefly illustrating a structure of a sub-pixel SP of a display device and a configuration for compensating for characteristic values of the sub-pixel SP according to embodiments of the present disclosure.

Referring to FIG. 3, each of the plurality of sub-pixels SP may include a light emitting device ED, a driving transistor DRT, a scan transistor SCT, and a storage capacitor Cst.

The light emitting device ED may include a first electrode and a second electrode and a light emitting layer EL positioned between the first electrode and the second electrode.

The first electrode of the light emitting device ED is a pixel electrode PE, and the second electrode of the light emitting device ED is a common electrode CE.

The pixel electrode PE of the light emitting device ED may be an electrode disposed in each sub-pixel SP, and the common electrode CE may be an electrode commonly disposed in all sub-pixels SP. Here, the pixel electrode PE may be an anode electrode and the common electrode CE may be a cathode electrode. Alternatively, the pixel electrode PE may be a cathode electrode and the common electrode CE may be an anode electrode.

For example, the light emitting device ED may be an organic light emitting diode OLED, a light emitting diode LED, or a quantum dot light emitting device.

The driving transistor DRT is a transistor for driving the light emitting device ED, and may include a first node N1, a second node N2, a third node N3, and the like.

The first node N1 of the driving transistor DRT may be a gate node of the driving transistor DRT, and may be electrically connected to a source node or a drain node of the scan transistor SCT. The second node N2 of the driving transistor DRT may be a source node or a drain node of the driving transistor DRT, and may be electrically connected to a source node or a drain node of the sensing transistor SENT and may also be electrically connected to the pixel electrode PE of the light emitting device ED. The third node N3 of the driving transistor DRT may be electrically connected to a driving voltage line DVL supplying a high potential driving voltage EVDD.

The scan transistor SCT may be controlled by a scan pulse SCAN, which is a type of gate signal, and may switch an electrical connection between the first node N1 of the driving transistor DRT and the data line DL. That is, the scan transistor SCT may be turned on or turned off according to the scan pulse SCAN supplied from the scan line SCL, which is a type of the gate line GL, and may control an electrical connection between the data line DL and the first node N1 of the driving transistor DRT.

The scan transistor SCT may be turned on by the scan pulse SCAN having a turn-on level voltage, and may transfer the data voltage Vdata supplied from the data line DL to the first node N1 of the driving transistor DRT.

Here, in the case that the scan transistor SCT is an n-type transistor, the turn-on level voltage of the scan pulse SCAN may be a high level voltage. If the scan transistor SCT is a p-type transistor, the turn-on level voltage of the scan pulse SCAN may be a low level voltage.

The storage capacitor Cst may be electrically connected to the first node N1 and the second node N2 of the driving transistor DRT. The storage capacitor Cst is charged with an amount of charge corresponding to the voltage difference between both ends, and serves to maintain the voltage difference between both ends for a predetermined frame time. Accordingly, during a predetermined frame time, the corresponding sub-pixel SP may emit light.

Referring to FIG. 3, each of the plurality of sub-pixels SP disposed on the display panel 110 of the display device 100 according to embodiments of the present disclosure may further include a sensing transistor SENT.

The sensing transistor SENT may be controlled by a sense pulse SENSE, which is a type of gate signal, and may be electrically connected to the second node N2 of the driving transistor DRT and a reference voltage line RVL. That is, the sensing transistor SENT is turned on or turned off according to the sense pulse SENSE supplied from a sense line SENL, which is another type of the gate line GL, and may switch an electrical connection between the reference voltage line RVL and the second node N2 of the driving transistor DRT The second node N2 of the driving transistor DRT is also referred to as a sensing node.

The sensing transistor SENT may be turned on by a sense pulse SENSE having a turn-on level voltage, and may transfer an initialization voltages VpreR, VpreS, etc. supplied from the reference voltage line RVL to the second node N2 of the driving transistor DRT. The reference voltage line RVL is also referred to as a sensing line.

A first initialization switch RPRE may switch an electrical connection between the reference voltage line RVL and an initialization voltage supply node NpreR. The first initialization switch RPRE includes a first end electrically connected to the reference voltage line RVL and a second end electrically connected to the first initialization voltage supply node NpreR.

A first initialization voltage VpreR is applied to the first initialization voltage supply node NpreR.

A second initialization switch SPRE may switch an electrical connection between the reference voltage line RVL and a second initialization voltage supply node NpreS. The second initialization switch SPRE includes a first end electrically connected to the reference voltage line RVL and a second end electrically connected to the second initialization voltage supply node NpreS.

The second initialization voltage VpreS is applied to the second initialization voltage supply node NpreS. A voltage level of the second initialization voltage VpreS may be different from a voltage level of the first initialization voltage VpreR.

The first initialization voltage VpreR may be a voltage input used to initialize the voltage of the second node N2 of the driving transistor DRT when the data voltage Vdata for image display is input to the data line DL. For example, the data voltage Vdata for image display is supplied to the first node N1 of the driving transistor DRT, and the first initialization voltage VpreR is supplied to the second node N2 of the driving transistor DRT, so that there may be generated a potential difference at both ends of the storage capacitor Cst.

The second initialization voltage VpreS may be a voltage input to initialize the voltage of the second node N2 of the driving transistor DRT when a voltage for sensing the characteristic value of the sub-pixel SP is input to the data line DL. For example, the voltage Vdata for sensing the characteristic value of the sub-pixel SP is supplied to the first node N1 of the driving transistor DRT, and the second initialization voltage VpreS may be supplied to the second node N2 of the driving transistor DRT, so that a potential difference may be generated between both ends of the storage capacitor Cst.

A power management circuit may generate the first initialization voltage VpreR and/or the second initialization voltage VpreS, and output the generated voltage to each node.

The sensing transistor SENT may be turned on by a sense pulse SENSE having a turn-on level voltage, and transfer the voltage of the second node N2 of the driving transistor DRT to the reference voltage line RVL.

Here, if the sensing transistor SENT is an n-type transistor, the turn-on level voltage of the sense pulse SENSE may be a high level voltage. If the sensing transistor SENT is a p-type transistor, the turn-on level voltage of the sense pulse SENSE may be a low level voltage.

A function of the sensing transistor SENT for transferring the voltage of the second node N2 of the driving transistor DRT to the reference voltage line RVL may be used when driving to sense the characteristic value of the sub-pixel SP. In this case, the voltage transferral to the reference voltage line RVL may be a voltage for calculating the characteristic value of the sub-pixel SP or a voltage in which the characteristic value of the sub-pixel SP is reflected.

Each of the driving transistor DRT, the scan transistor SCT, and the sensing transistor SENT may be an n-type transistor or a p-type transistor. In embodiments of the present disclosure, for convenience of description, each of the driving transistor DRT, the scan transistor SCT, and the sensing transistor SENT is an n-type as an example.

The storage capacitor Cst may not be a parasitic capacitor (e.g., Cgs, Cgd) which is an internal capacitor between the gate node and the source node (or drain node) of the driving transistor DRT, but may be an external capacitor intentionally designed outside the driving transistor DRT.

The scan line SCL and the sense line SENL may be different gate lines GL. In this case, the scan pulse SCAN and the sense pulse SENSE may be separate gate signals, and the on-off timing of the scan transistor SCT and the on-off timing of the sensing transistor SENT in one sub-pixel SP may be independent. That is, the on-off timing of the scan transistor SCT and the on-off timing of the sensing transistor SENT in one sub-pixel SP may be the same or different.

Alternatively, the scan line SCL and the sense line SENL may be the same gate line GL. That is, the gate node of the scan transistor SCT and the gate node of the sensing transistor SENT in one sub-pixel SP may be connected to one gate line GL. In this case, the scan pulse SCAN and the sense pulse SENSE may be the same gate signal, and the on-off timing of the scan transistor SCT and the on-off timing of the sensing transistor SENT in one sub-pixel SP may be the same.

The structure of the sub-pixel SP shown in FIG. 3 is merely an example, and may be variously modified by further including one or more transistors or further including one or more capacitors or by omitting one or more transistors or capacitors.

In addition, in FIG. 3, the sub-pixel SP structure is described assuming that the display device 100 is a self-luminous display device. However, in the case that the display device 100 is a liquid crystal display device, each sub-pixel SP may include a transistor and a pixel electrode.

Referring to FIG. 3, the display device 100 according to the present disclosure may include a line capacitor Crvl. The line capacitor Crvl may be a capacitor element having a first end electrically connected to the reference voltage line RVL and a second end electrically connected to ground GND or is a parasitic capacitor formed on the reference voltage line RVL.

Meanwhile, the above-described data driving circuit may include one or more source driver integrated circuits SDICs.

Referring to FIG. 3, the source driver integrated circuit SDIC may include a digital-to-analog converter DAC. The timing controller 140 may convert input image data according to a preset interface and output the converted image data to a digital-to-analog converter DAC.

The source driver integrated circuit SDIC may further include an analog-to-digital converter ADC in some cases. The analog-to-digital converter ADC may sense the voltage value of the reference voltage line RVL. The voltage sensed by the analog-to-digital converter ADC may be a voltage in which the characteristic value of the sub-pixel SP is reflected.

A sampling switch SAM may be configured to switch an electrical connection between the analog-to-digital converter ADC and the reference voltage line RVL. The sampling switch SAM may be disposed in the source driver integrated circuit SDIC.

Meanwhile, the characteristic value of the sub-pixel SP may be a characteristic value of the driving transistor DRT or the light emitting device ED. The characteristic value of the driving transistor DRT may include a threshold voltage and mobility of the driving transistor DRT. The characteristic value of the light emitting device ED may include a threshold voltage of the light emitting device ED.

The analog-to-digital converter ADC may receive an analog voltage, convert the analog voltage into a digital value, and output the digital value to the timing controller 140.

The timing controller 140 may include a memory 310 storing characteristic value information of the sub-pixel SP, and a compensation circuit 320 for performing a calculation for compensating for a change in the characteristic value of the sub-pixel SP based on information stored in the memory 310.

Information for compensating the characteristic value of the sub-pixel SP may be stored in the memory 310. For example, information on the threshold voltage and mobility of the driving transistor DRT of each of the plurality of sub pixels SP may be stored in the memory 310, or information on the threshold voltage of the light emitting device ED included in the sub-pixel SP may be stored in the memory 310.

Information on the threshold voltage of the light emitting device ED may be stored in a lookup table LUT of the memory 310.

The compensation circuit 320 may calculate the degree of change in the characteristic value of the sub-pixel SP based on the digital value input from the analog-to-digital converter ADC and the characteristic value information of the sub-pixel SP stored in the memory 310. The characteristic value of the sub-pixel SP stored in the memory 310 may be updated based on the calculated information.

The timing controller 140 may convert the image data by reflecting the change in the characteristic value of the sub-pixel SP calculated by the compensation circuit 320 and output the converted image data to the digital-to-analog converter DAC.

The digital-to-analog converter DAC may output the data voltage Vdata in which the characteristic value change of the sub-pixel SP is reflected to the data line DL.

The above process of sensing and compensating for a change in the characteristic value of the sub-pixel SP is also referred to as a "sub-pixel characteristic value compensation process".

Figure 4:
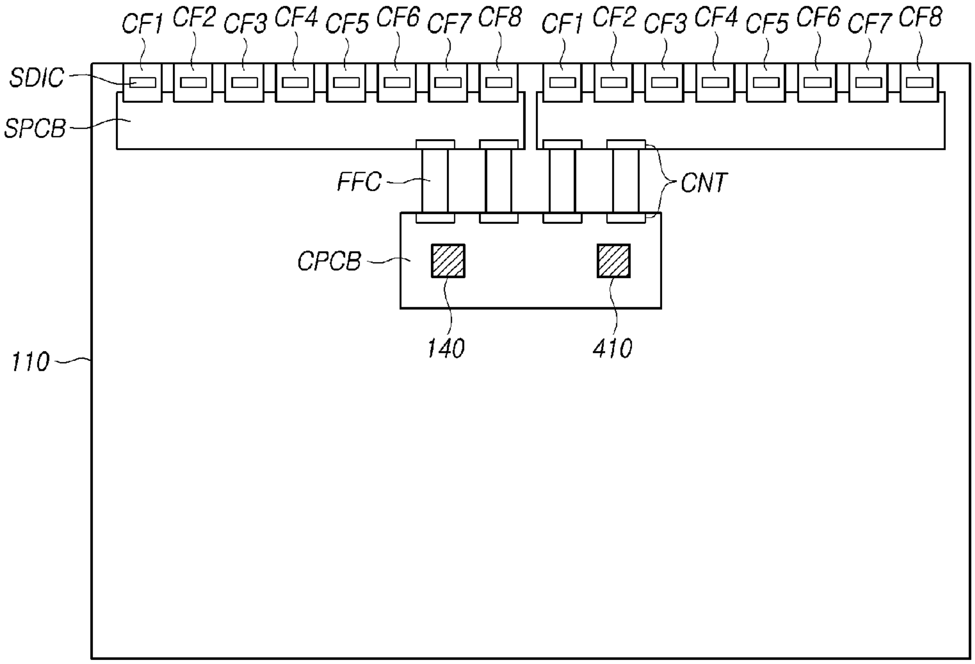
FIG. 4 illustrates the configurations configured to supply various voltages to a display panel in a display device according to embodiments of the present disclosure.

FIG. 4 exemplarily illustrates components configured to supply various voltages to a display panel 110 in a display device according to embodiments of the present disclosure.

Referring to FIG. 4, a display device according to embodiments of the present disclosure may include one or more circuit films CF connected to the display panel 110, and a source driver integrated circuit SDIC mounted on the circuit film CF.

Referring to FIG. 4, one end of the circuit film CF may be connected to the display panel 110. One end of the circuit film CF may be bonded to a pad portion (not shown) of the display panel 110. The circuit film CF may be bonded to a pad portion positioned on the front surface of the display panel 110 and bent in the rear direction of the display panel 110.

The other end of the circuit film CF may be connected to a source printed circuit board SPCB.

The source printed circuit board SPCB may be connected to the other end of one or more circuit films CF. For example, referring to FIG. 4, one source printed circuit board SPCB may be connected to first to eighth circuit films CF1 to CF8.

The source printed circuit board SPCB may be electrically connected to a control printed circuit board CPCB through a connection member.

The connecting member, for example, may be implemented as a flexible flat cable (FFC). The flexible flat cable (FFC) may be connected to a connector CNT disposed on the source printed circuit board SPCB and the control printed circuit board CPCB, respectively, and may electrically connect between the source printed circuit board SPCB and the control printed circuit board CPCB.

The timing controller 140 may be mounted on the control printed circuit board CPCB. A power management circuit 410 may be further mounted on the control printed circuit board CPCB. One control printed circuit board CPCB may be connected to two or more source printed circuit boards SPCBs.

Meanwhile, referring to FIG. 4, in the case that the display panel 110 is a flexible display panel, the shape of the display panel 110 may be changed.

For example, as shown in FIG. 2, the display device 100 may be bent during the transforming period based on a bending axis extending in the vertical direction. Accordingly, the shape of the display panel 110 may also be bent based on the bending axis.

If the display panel 110 is bent, stress may be applied to the circuit film CF configured to electrically connect the display panel 110 and the source printed circuit board SPCB.

In particular, in the direction of both ends of the source printed circuit board SPCB, this stress may act more strongly, and a stronger force may be applied to the circuit film (e.g., CF1~CF8) connected at both ends of the source printed circuit board SPCB.

When the shape of the display panel 110 is changed while the display panel 110 displays an image, the bonding between the display panel 110 and the circuit film CF may be further weakened due to heat generated in the display panel 110.

The power of the display panel 110 may be calculated by Equation 1 below.

$$P=I^2R \qquad \text{[Equation 1]}$$

In Equation 1, P is power, I is a current flowing through the display panel 110, and R is a resistance value of the display panel 110. The current flowing through the display panel 110 may be a current flowing through the light emitting device ED through the driving voltage line DVL (refer to FIG. 3).

Since the power P can be converted into heat, when the value of the current I flowing in the driving voltage line DVL of the display panel 110 increases, the amount of heat generated in the display panel 110 may be increased in proportion to the square of the current (I^2).

Accordingly, the bonding between the display panel 110 and the circuit film CF may be weakened. In particular, there may be weakened the connection from the circuit film CF connected to both ends of the source printed circuit board SPCB to which the greatest stress is applied.

Therefore, even if the shape of the display panel 110 is changed while the display panel 110 displays an image, it is required to provide a display device having a good connection between the display panel 110 and the circuit film CF.

Figure 5:
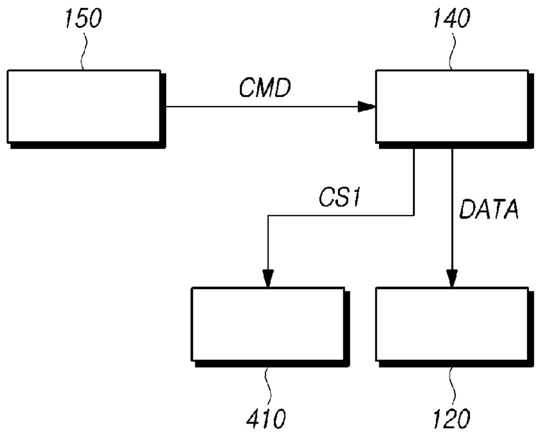
FIGS. 5 to 7 are diagrams for explaining a configuration in which the timing controller controls the power management circuit and/or the data driving circuit in the transforming period based on the command signal.
Figure 6:
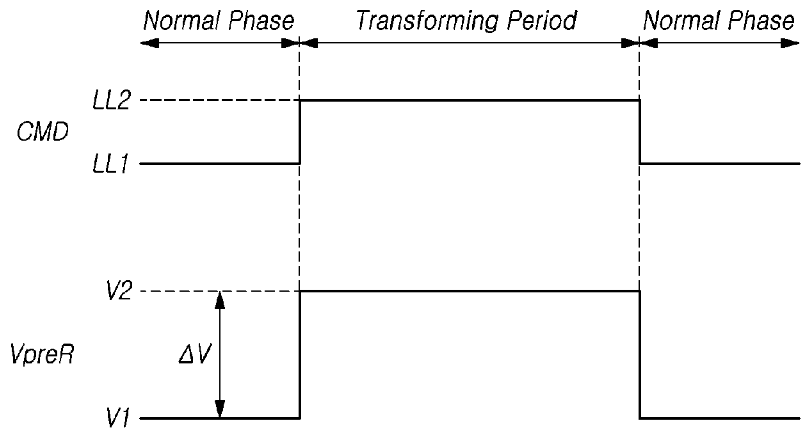
Figure 7:
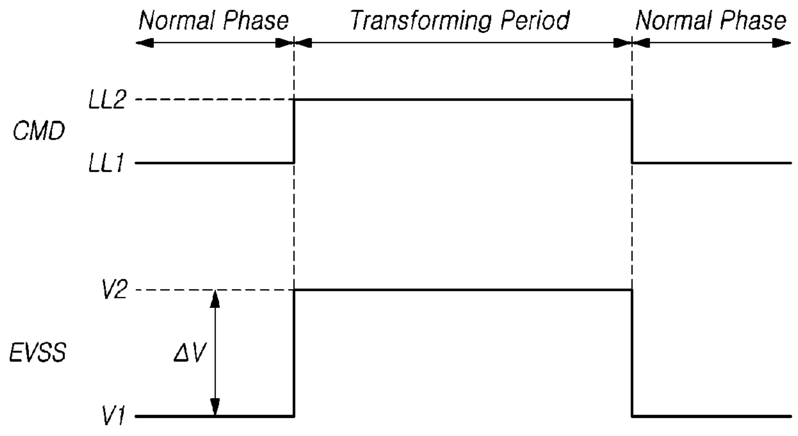

FIGS. 5 to 7 are diagrams for explaining a configuration in which the timing controller controls the power management circuit and/or the data driving circuit in the transforming period based on the command signal.

Referring to FIG. 5, a host system 150 may output a command signal CMD defining a transforming period of the display device to the timing controller 140. The command signal CMD may define a normal state or a normal phase.

For example, the transforming period and the normal state may be respectively defined according to the logic level of the command signal CMD.

For example, during the transforming period, the display panel may be bent to a preset angle.

The timing controller 140 may control the power management circuit 410 and/or the data driving circuit 120 to lower or decrease the luminance of the display device during the transforming period based on the input command signal CMD.

The timing controller 140 may output a first control signal CS1 to the power management circuit 410 during the transforming period. The power management circuit 410 may receive the first control signal CS1 and may output a voltage having a different voltage level from the voltage output in the normal state during the transforming period.

For example, the power management circuit 410 may output the low potential driving voltage EVSS (refer to FIG. 3) having a higher (e.g., greater) voltage level during the transforming period compared to the normal state. Accordingly, the voltage difference between the voltages applied to both ends of the light emitting device ED may be reduced, so that the luminance or the brightness of at least one sub-pixel may be lowered.

In another example, the power management circuit 410 may output a first initialization voltage VpreR (refer to FIG. 3) of a higher voltage level during the transforming period than in the normal state. Accordingly, the voltage difference between the source node and the drain node of the driving transistor DRT may decrease, and the voltage value of the current flowing through the light emitting device ED may also decrease. Accordingly, the luminance of at least one sub-pixel may be lowered.

The timing controller 140 may output the converted image data DATA during the transforming period to the data driving circuit 120. The timing controller 140 may output the converted image data DATA based on a value different from the characteristic value of the sub-pixel stored in the aforementioned memory 310 (refer to FIG. 3).

For example, the timing controller 140 may control the data driving circuit 120 to output a data voltage of a lower voltage level (or a higher voltage level) to the data line in order for at least one sub-pixel to emit light with a lower luminance.

The timing controller 140 may control the power management circuit 410 and/or the data driving circuit 120 in order for at least one sub-pixel to emit light with a reduced luminance during the transforming period, so that there may be a lower magnitude of the current flowing through the display panel 110 during the transforming period. Accordingly, it is possible to significantly reduce the heat generated in the display panel 110 during the transforming period.

Referring to FIGS. 6 and 7, in the case that the command signal CMD is at the first logic level LL1, the display device is in a normal phase or a normal state, and if the command signal CMD is at a second logic level LL2, the display device may be in a transforming period according to one embodiment.

The first logic level LL1 may be a low level or a high level, and the second logic level LL2 may be a high level or a logic level. Hereinafter, it is assumed that the first logic level LL1 is a low level and the second logic level LL2 is a high level for convenience of description, but is not limited thereto.

Referring to FIG. 6, in a period in which the command signal CMD is at a low level, the first initialization voltage VpreR may be a first voltage level V1. In a period in which the command signal CMD is at the high level, the first initialization voltage VpreR may be a second voltage level V2. In this case, the second voltage level V2 may be a voltage increased by a preset voltage ΔV from the first voltage level V1.

That is, referring to FIGS. 5 and 6, the timing controller 140 may receive the command signal CMD and output the first control signal CS1 to the power management circuit 410 during the transforming period. The power management circuit 410 may receive the first control signal CS1 and increase the voltage level of the first initialization voltage VpreR by a preset voltage ΔV from the first voltage level V1 to output the first initialization voltage VpreR of the second voltage level V2 during the transforming period.

Accordingly, in the driving transistor of at least one sub-pixel, the voltage difference between the source node and the drain node may be reduced, so that the magnitude of the current flowing through the driving transistor may be also reduced. Accordingly, the magnitude of the current flowing through the light emitting device is reduced.

Referring to FIG. 7, in a period in which the command signal CMD is at the low level, the low potential driving voltage EVSS may be the first voltage level V1. In a period in which the command signal CMD is at the high level, the low potential driving voltage EVSS may be the second voltage level V2. In this case, the second voltage level V2 may be a voltage increased by a preset voltage ΔV from the first voltage level V1.

That is, referring to FIGS. 5 and 7, the timing controller 140 may receive the command signal CMD and output the first control signal CS1 to the power management circuit 410 during the transforming period. The power management circuit 410 may receive the first control signal CS1 and increase the voltage level of the low potential driving voltage EVSS from the first voltage level V1 by a preset voltage ΔV to output the low-potential driving voltage EVSS of the second voltage level V2 during the transforming period.

Accordingly, the difference between the voltage applied to the first electrode of the light emitting device and the voltage applied to the second electrode of the light emitting device may be reduced. Accordingly, the magnitude of the current flowing through the light emitting device may be also reduced.

Even if the magnitude of the current flowing through the driving voltage line of the display panel is slightly reduced, the amount of heat generated in the display panel may be decreased in proportion to the square of the current (I^2). Accordingly, there may be greatly reduced the possibility of occurrence of the above-described bonding defect problem.

Accordingly, the timing controller may control the power management circuit 410 and/or the data driving circuit 120 to reduce the luminance of the sub-pixel during the transforming period, and reduce heat generated from the display panel during the transforming period.

Figure 8:
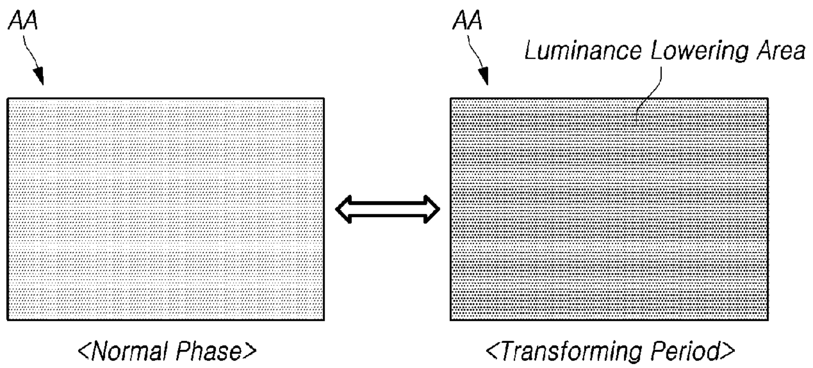
FIG. 8 illustrates a decrease in luminance in the entire display area during a transforming period of the display panel.

FIG. 8 illustrates a decrease (reduction) in luminance in the entire display area during a transforming period of the display panel 110.

Referring to FIG. 8, even if the same image data is input to the timing controller during the normal phase and the transforming period, there may occur a difference of the luminance of the image displayed in the display area AA.

The luminance of the image displayed in the display area AA during the transforming period may be less than a luminance during the normal phase or the normal state.

For example, if the voltage level of a low potential common voltage EVSS, which is a common voltage commonly applied to all sub-pixels, increases during the transforming period, the luminance of the sub-pixels in the entire display area AA may be decreased.

In addition, in the case that the first initialization voltage VpreR is a voltage commonly applied to all sub-pixels, if the voltage level of the first initialization voltage VpreR increases during the transforming period, the luminance of sub-pixels may decrease in the entire display area AA.

In addition, in the case that the timing controller converts the image data so that the luminance of all sub-pixels is lowered and outputs the converted image data to the data driving circuit, the luminance of sub-pixels may decrease in the entire display area AA.

Figure 9:
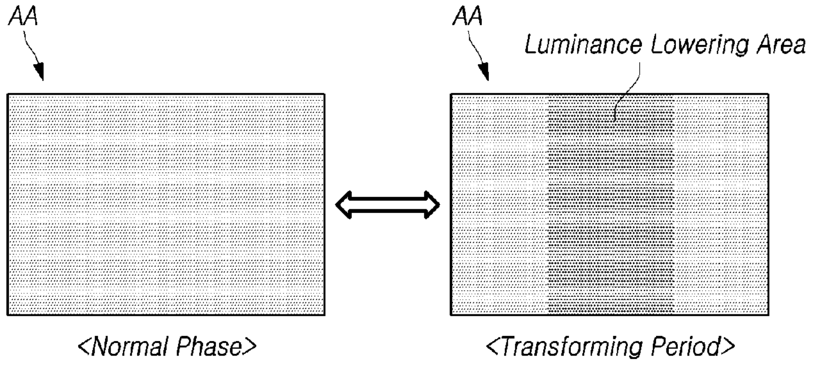
FIG. 9 illustrates a decrease in luminance in at least a partial area of a display area during a transforming period of the display panel.

FIG. 9 illustrates a decrease in luminance in at least a partial area of a display area during a transforming period of the display panel.

Referring to FIG. 9, luminance of sub-pixels may decrease in at least a portion of the display area AA during the transforming period.

For example, the timing controller may control the data driving circuit so that sub-pixels positioned in at least a partial area of the display area AA emit light with a lower luminance.

Alternatively, the timing controller may control the power management circuit so that sub-pixels positioned in at least a partial area of the display area AA emit light with a lower luminance.

Meanwhile, in the case that the luminance of the at least one sub-pixel is lowered, an area in which the at least one sub-pixel is disposed may overlap a bending area in the display panel.

Referring to FIG. 9, when the display panel is bent in the central region, the bending area of the display panel and the region where the sub-pixels emitting light with lower luminance are disposed may overlap each other.

Referring to FIGS. 8 and 9, the display device according to embodiments of the present disclosure may further output a message (not shown) in the display area to inform the user that the shape of the display device is being changed during the transforming period in which the shape of the display device is changed.

For example, the message indicating that the shape of the display device is being changed may be a text message displayed together with images of other content (e.g., movies, games, broadcasts, etc.) in the display area, or a picture message.

For example, in the display device according to the embodiments of the present disclosure, the luminance of the sub-pixel may be reduced in a partial area among regions where images of other content are displayed, and a message indicating that the shape of the display device is being changed may be output in the area of lowered luminance.

Meanwhile, during the transforming period, the display device according to embodiments of the present disclosure may display the image by reducing the luminance of the image data input to the timing controller in at least a part of the display areas.

Accordingly, if the preset first image data is input to the timing controller during the transforming period, the luminance of the image displayed may be in a reduced state in at least a portion of the display area.

For example, in the display device according to the embodiments of the present disclosure, even if a data voltage of the same voltage level is applied to display the first image in any one sub-pixel during the transforming period and the normal state period, the sub-pixels may emit light with different luminance.

For example, if the preset first image data is image data of a monochromatic pattern, the luminance of the monochromatic pattern may be reduced and displayed in at least some areas of the display area. Accordingly, there may occur a difference in luminance between an area in which the luminance is reduced and not displayed and an area in which the luminance is lowered and displayed.

Meanwhile, in the display device according to the embodiments of the present disclosure, the degree of reduction of the luminance of the sub-pixel may be different for each area in the display area AA.

For example, in the display device according to embodiments of the present disclosure, the degree of reduction of the luminance of the sub-pixel may be greatest near the center of the display area AA, and may gradually decrease toward the edge of the display area AA. Accordingly, in the display area AA, a boundary between an area displaying an image with reduced luminance and an area displaying an image with non-reduced luminance may be blurred. Accordingly, the reduction in luminance may be visually recognized relatively small by the user of the display device. But embodiments of the present disclosure is not limited thereto. For example, the degree of lowering of the luminance of the sub-pixel may be greatest at one or more positions of the display area AA, and may smaller at the remaining portion.

In addition, by reducing the luminance in the central region of the display area AA where a relatively high-grayscale screen is frequently displayed, there may be significantly increased the effect of reducing the current flowing through the display panel even if the luminance of the entire display area AA is not lowered.

Figure 10:
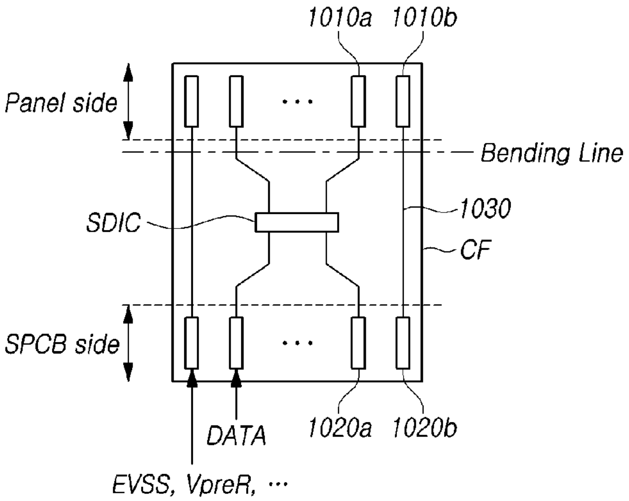
FIG. 10 illustrates a circuit film on which a source driver integrated circuit is mounted.

FIG. 10 illustrates a circuit film CF on which a source driver integrated circuit SDIC is mounted.

Referring to FIG. 10, the circuit film CF may include one or more first pins 1010*a* and one or more second pins 1010*b* connected to a display panel, and one or more third pins 1020*a* and one or more fourth pins 1020*b* connected to a source printed circuit board SPCB.

One or more first pins 1010*a* may be configured to output the data voltage transferral from the source driver integrated circuit SDIC to the display panel.

One or more second pins 1010*b* may be electrically connected to the fourth pins 1020*b*. The circuit film CF may further include a line 1030 for electrically connecting the second pin 1010*b* and the fourth pin 1020*b*. The circuit film CF may further include a line 1030 for electrically connecting the source driver integrated circuit SDIC and the first pin 1010*a*. The circuit film CF may further include a line 1030 for electrically connecting the third pin 1020*a* and the source driver integrated circuit SDIC.

A DC voltage (e.g., EVSS, VpreR, etc.) transmitted from a source printed circuit board may be input to one or more fourth pins 1020*b*. The voltage input to the fourth pin 1020*b* may be transmitted to the second pin 1010*b* through the line 1030. The one or more second pins 1010*b* may transmit a DC voltage transmitted through the line 1030 to the display panel.

The image data DATA input from the timing controller may be input to one or more third pins 1020*a* The image data DATA may be image data converted according to a preset interface (e.g., an LVDS interface, etc.). A data driving control signal input from a timing controller may be input to one or more third pins 1020*a*.

The image data DATA input to the one or more third pins 1020*a* may be transmitted to the source driver integrated circuit SDIC through the line 1030.

The source driver integrated circuit SDIC may output a data voltage to one or more first pins 1010*a* based on the input image data DATA.

One or more first pins 1010*a* and one or more second pins 1010*b* may be connected to a pad portion disposed on the display panel. One or more third pins 1020*a* and one or more fourth pins 1020*b* may be electrically connected to the pad portion of the source printed circuit board.

The circuit film CF may be bent at a bending line such that at least a portion of the circuit film CF may be disposed on the rear side of the display panel.

Meanwhile, as described above, in the case that the display device is in a normal phase and the transforming period in which the shape of the display device is changed, the voltage levels of voltages output from the power management circuit to the display panel may be different from each other.

Accordingly, in the transforming period, the level of the voltage input to the fourth pin 1020*b* of the circuit film CF may be different from that when the display device is in a normal state.

For example, in the fourth pin 1020*b* of the circuit film CF to which the low potential driving voltage EVSS or the first initialization voltage VpreR is input, the voltages of different levels may be applied when the display device is in a normal state and when a transforming period in which the shape of the display device is changed.

Accordingly, the embodiments of the present disclosure may provide a display device in which the shape of the display device can be changed during an image display period.

Accordingly, the embodiments of the present disclosure may provide a display device capable of greatly reducing the possibility of image quality defects even if the shape of the display device is changed during the image display period.

The above-described embodiments of the present disclosure may be briefly summarized as follows.

The embodiments of the present disclosure may provide a display device 100 including a display panel 110 on which one or more sub-pixels SP including a light emitting device ED and a driving transistor DRT for driving the light emitting device ED are disposed in a display area, and whose shape is changed during a transforming period, a timing controller 140 configured to receive image data and a command signal CMD defining the transforming period, and convert the image data to output converted image data DATA, and a data driving circuit 120 configured to receive the converted image data and outputting a data voltage Vdata, wherein, in the transforming period, at least one sub-pixel SP emits light based on the image data input to the timing controller 140, and emits light with a luminance lower than a luminance corresponding to a grayscale of the image data.

In the display device according to embodiments of the present disclosure, the command signal CMD may define the transforming period and a normal state or a normal phase in which the shape of the display panel 110 is fixed.

In the display device according to embodiments of the present disclosure, the light emitting device may include a first electrode PE electrically connected to the driving transistor DRT, a second electrode CE configured to apply a low potential driving voltage EVSS, and a light emitting layer EL disposed between the first electrode PE and the second electrode CE.

The display device according to embodiments of the present disclosure may further include a power management circuit 410 configured to output a first initialization voltage VpreR applied to a first initialization voltage supply node NpreR and the low potential driving voltage EVSS to the display panel 110, wherein the first initialization voltage supply node NpreR may be positioned on the display panel 110 and may be electrically connected to the first electrode PE of the light emitting device ED through a reference voltage line RVL.

In the display device according to embodiments of the present disclosure, a voltage level of the first initialization voltage VpreR output by the power management circuit 410 during the transforming period may be higher than a voltage level of the first initialization voltage VpreR output by the power management circuit 410 in the normal state.

In the display device according to embodiments of the present disclosure, a voltage level of the low potential driving voltage EVSS output by the power management circuit 410 during the transforming period may be higher than a voltage level of the low potential driving voltage EVSS output by the power management circuit 410 in the normal state.

In the display device according to embodiments of the present disclosure, the timing controller 140 may further include a memory 310 in which a value for compensating for a change in the characteristic value of the one or more sub-pixels SP is stored, wherein, in the transforming period, the timing controller 140 may compensate the at least one sub-pixel with a value different from the value stored in the memory 310.

In the display device according to embodiments of the present disclosure, the timing controller 140 may convert the image data compensated with a value different from the value stored in the memory 310 according to a preset interface and output the converted image data to the data driving circuit 120.

In the display device according to embodiments of the present disclosure, the data driving circuit 120 may include at least one source driver integrated circuit SDIC, and the source driver integrated circuit SDIC may be mounted on a circuit film CF in a chip-on-film (COF) manner.

In the display device according to embodiments of the present disclosure, the circuit film CF may include one or more first pins 1010*a* configured to output the data voltage Vdata to the display panel 110, one or more second pins 1010*b* configured to output a DC voltage (e.g., EVSS, VpreR, etc.) to the display panel 110, one or more third pins 1020*a* electrically connected to the data driving circuit 120 and to which image data DATA converted according to a preset interface format is input, and one or more fourth pins 1020*b* configured to receive the DC voltage and transmit the DC voltage to the one or more second pins 1010*b*.

In the display device according to embodiments of the present disclosure, voltage levels of the DC voltages input to the one or more fourth pins 1020*b* in the transforming period and the normal state may be different from each other.

In the display device according to embodiments of the present disclosure, the at least one sub-pixel SP may be located in a bending area where the display panel 110 is bent.

In the display device according to embodiments of the present disclosure, the display panel 110 may be bent to a preset angle during the transforming period.

The display device according to embodiments of the present disclosure may further include a host system 150 configured to output the image data and the command signal CMD.

The above description has been presented to enable any person skilled in the aft to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A display device comprising:

a display panel including one or more sub-pixels in a display area, the one or more sub-pixels having a light emitting device and a driving transistor configured to drive the light emitting device, and the display panel having a shape that is changed during a transforming period;

a timing controller configured to receive image data and a command signal defining the transforming period, the timing controller configured to convert the image data to output converted image data;

a data driving circuit configured to receive the converted image data and output a data voltage; and a power management circuit configured to output a first initialization voltage applied to a first initialization voltage supply node and a low potential driving voltage to the display panel, wherein, in the transforming period, at least one sub-pixel emits light based on the image data input to the timing controller, and emits light with a luminance that is less than a luminance corresponding to a grayscale of the image data, wherein the command signal defines a transforming period and a normal state in which the shape of the display panel is fixed, wherein a voltage level of the first initialization voltage output by the power management circuit during the transforming period is greater than a voltage level of the first initialization voltage output by the power management circuit in the normal state.

2. The display device of claim 1, wherein, in the normal state, the display panel has a flat shape or a curved shape.

3. The display device of claim 2, wherein, during the transforming period, the shape of the display device changes from the flat shape to the curved shape, or changes from the curved shape to the flat shape.

4. The display device of claim 1, wherein the light emitting device comprises:

a first electrode electrically connected to the driving transistor;

a second electrode configured to be applied with a low potential driving voltage; and a light emitting layer between the first electrode and the second electrode.

5. The display device of claim 4 wherein the first initialization voltage supply node is electrically connected to the first electrode of the light emitting device through a reference voltage line.

6. The display device of claim 4, wherein the first initialization voltage is configured to initialize a voltage of the first electrode of the light emitting device when the data voltage is input to a gate node of the driving transistor.

7. The display device of claim 1, wherein the timing controller further comprises:

a memory configured to store a value for compensating for a change in a characteristic value of the one or more sub-pixels, wherein, in the transforming period, the timing controller compensates the at least one sub-pixel with a value different from the value stored in the memory.

8. The display device of claim 7, wherein the timing controller is configured to convert the image data compensated with the value different from the value stored in the memory according to a preset interface and output the converted image data to the data driving circuit.

9. The display device of claim 1, wherein the data driving circuit comprises at least one source driver integrated circuit, and the at least one source driver integrated circuit is mounted on a circuit film in a chip-on-film manner.

10. The display device of claim 9, wherein the circuit film comprises:

one or more first pins configured to output the data voltage to the display panel;

one or more second pins configured to output a direct current (DC) voltage to the display panel;

one or more third pins electrically connected to the data driving circuit and to which image data converted according to a preset interface format is input; and one or more fourth pins configured to receive the DC voltage and transmit the DC voltage to the one or more second pins.

11. The display device of claim 1, wherein the at least one sub-pixel is located in a bending area where the display panel is bent.

12. The display device of claim 1, wherein the display panel is bent to a preset angle during the transforming period.

13. The display device of claim 1, further comprising:

a host system configured to output the image data and the command signal.

14. The display device of claim 1, wherein, in the transforming period, the at least one sub-pixel emits light with a luminance that is less than a luminance corresponding to a grayscale of the converted image data.

15. The display device of claim 1, wherein when a same image data is input to the timing controller during the normal state and the transforming period, the at least one sub-pixel emits light with a luminance in the transforming period that is less than a luminance in the transforming period.

16. The display device of claim 1, wherein among the at least one sub-pixel, a degree of reducing luminance of at least one sub-pixel is different from another sub-pixel.

17. A display device comprising:

a display panel including one or more sub-pixels in a display area, the one or more sub-pixels having a light emitting device and a driving transistor configured to drive the light emitting device, and the display panel having a shape that is changed during a transforming period;

a timing controller configured to receive image data and a command signal defining the transforming period, the timing controller configured to convert the image data to output converted image data;

a data driving circuit configured to receive the converted image data and output a data voltage; and a power management circuit configured to output a first initialization voltage applied to a first initialization voltage supply node and a low potential driving voltage to the display panel, wherein, in the transforming period, at least one sub-pixel emits light based on the image data input to the timing controller, and emits light with a luminance that is less than a luminance corresponding to a grayscale of the image data, wherein the command signal defines a transforming period and a normal state in which the shape of the display panel is fixed, and wherein a voltage level of the low potential driving voltage output by the power management circuit during the transforming period is greater than a voltage level of the low potential driving voltage output by the power management circuit in the normal state.

18. A display device comprising:

a display panel including one or more sub-pixels in a display area, the one or more sub-pixels having a light emitting device and a driving transistor configured to drive the light emitting device, and the display panel having a shape that is changed during a transforming period;

a timing controller configured to receive image data and a command signal defining the transforming period, the timing controller configured to convert the image data to output converted image data; and a data driving circuit configured to receive the converted image data and output a data voltage, wherein the command signal defines the transforming period and a normal state in which the shape of the display panel is fixed, wherein, in the transforming period, at least one sub-pixel emits light based on the image data input to the timing controller, and emits light with a luminance that is less than a luminance corresponding to a grayscale of the image data, wherein the data driving circuit comprises at least one source driver integrated circuit, and the at least one source driver integrated circuit is mounted on a circuit film in a chip-on-film manner, wherein the circuit film comprises:

one or more first pins configured to output the data voltage to the display panel;

one or more second pins configured to output a direct current (DC) voltage to the display panel;

one or more third pins electrically connected to the data driving circuit and to which image data converted according to a preset interface format is input;

one or more fourth pins configured to receive the DC voltage and transmit the DC voltage to the one or more second pins, and wherein voltage levels of DC voltages input to the one or more fourth pins in the transforming period and the normal state are different from each other.

* * * * *